US012483996B2

(12) United States Patent
Gutman et al.

(10) Patent No.: US 12,483,996 B2
(45) Date of Patent: Nov. 25, 2025

(54) POWER HEADROOM REPORT AND CONTROL FOR REPEATERS

(71) Applicant: QUALCOMM Incorporated, San Diego, CA (US)

(72) Inventors: Igor Gutman, Hod HaSharon (IL); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 555 days.

(21) Appl. No.: 17/945,469

(22) Filed: Sep. 15, 2022

(65) Prior Publication Data

US 2024/0098653 A1 Mar. 21, 2024

(51) Int. Cl.
*H04W 52/36* (2009.01)
*H04W 52/46* (2009.01)

(52) U.S. Cl.
CPC ......... *H04W 52/365* (2013.01); *H04W 52/46* (2013.01)

(58) Field of Classification Search
CPC .... H04W 52/36; H04W 52/365; H04W 52/46
See application file for complete search history.

(56) References Cited

U.S. PATENT DOCUMENTS

| 11,665,613 | B1 * | 5/2023 | Hindy | H04W 40/005 |
| | | | | 709/220 |
| 11,757,579 | B2 * | 9/2023 | Abedini | H04L 1/1861 |
| | | | | 370/329 |
| 12,004,092 | B2 * | 6/2024 | Abedini | H04W 52/365 |
| 12,101,147 | B2 * | 9/2024 | Raghavan | H04B 7/0608 |
| 12,107,660 | B1 * | 10/2024 | Hatamian | H04B 7/15507 |
| 2021/0306962 | A1 * | 9/2021 | Abedini | H04B 1/04 |
| 2022/0045742 | A1 * | 2/2022 | Abedini | H04W 72/0453 |

OTHER PUBLICATIONS

International Search Report and Written Opinion—PCT/US2023/072217—ISA/EPO—Nov. 30, 2023.
Samsung: "Enhancements to Timing, Power Control and CLI for NR IAB", 3GPP TSG RAN WG1 #105-e, R1-2105332, 3rd Generation Partnership Project, Mobile Competence Centre, 650, Route Des Lucioles, F-06921 Sophia-Antipolis Cedex, France, vol. RAN WG1, No. e-Meeting, May 19, 2021-May 27, 2021, May 12, 2021, 6 Pages, XP052011377, section 2.2, p. 3-p. 4.

* cited by examiner

*Primary Examiner* — Hai V Nguyen
(74) *Attorney, Agent, or Firm* — Patterson & Sheridan, L.L.P.

(57) ABSTRACT

Certain aspects of the present disclosure provide a method for wireless communication by a network entity, generally including receiving a repeater power headroom report (RPHR) for at least a first repeater and performing one or more actions, based on the RPHR, to maintain a link between a user equipment (UE) and the network entity or another UE.

28 Claims, 12 Drawing Sheets

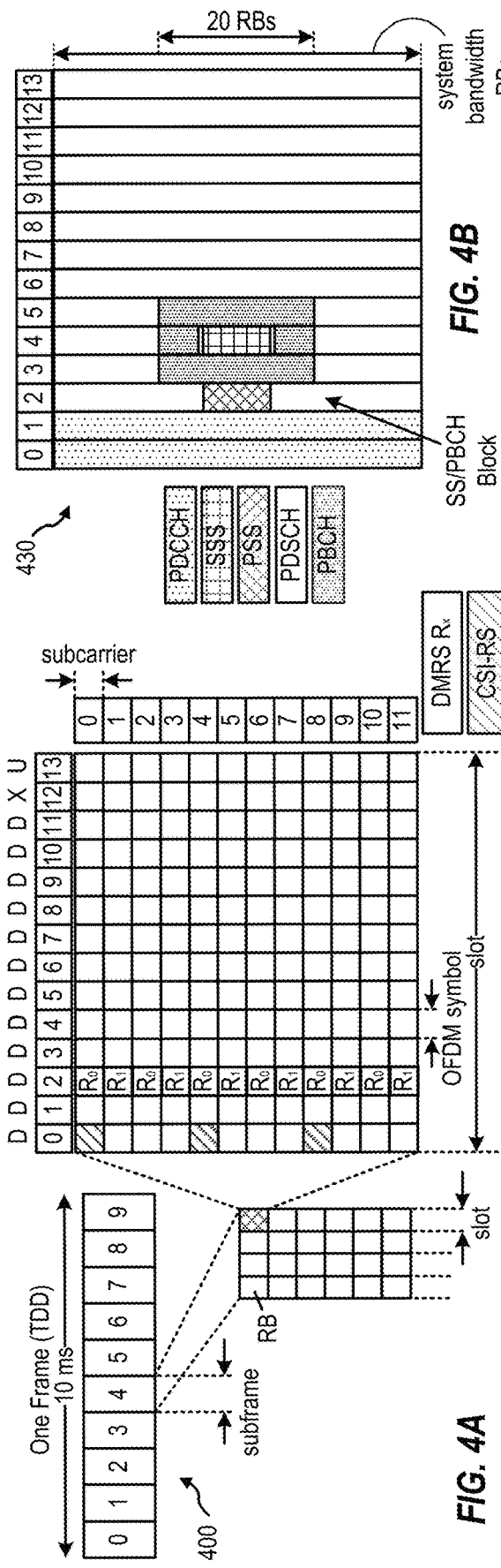
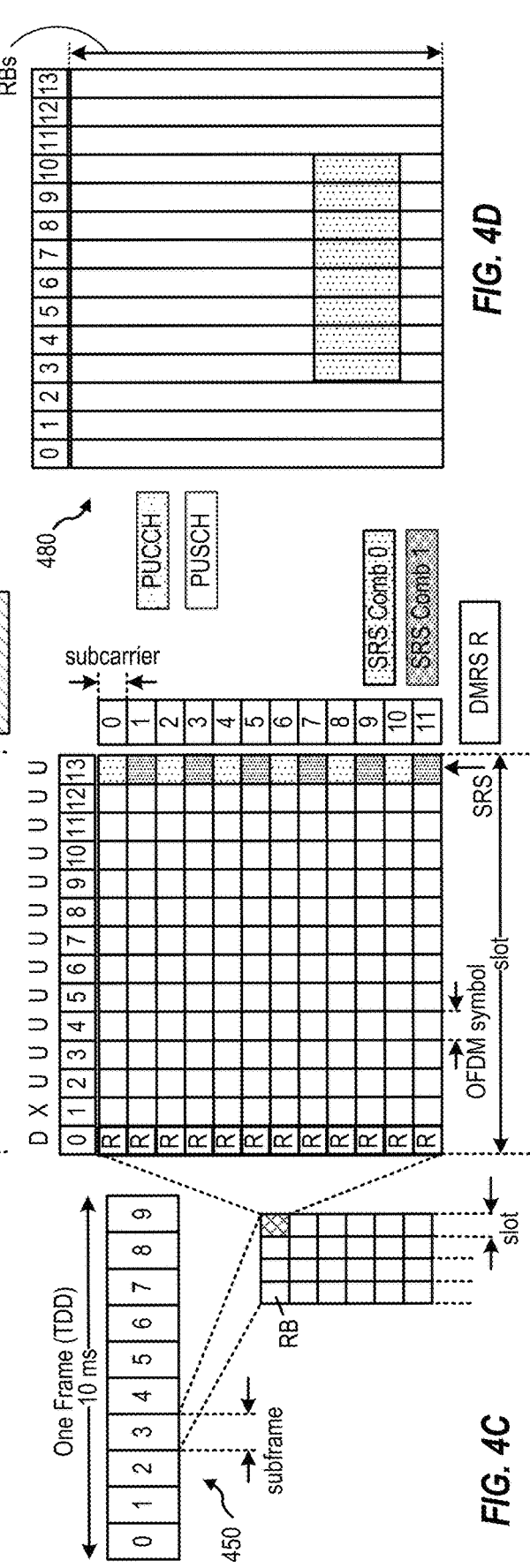

POWER HEADROOM REPORT AND CONTROL FOR REPEATERS

BACKGROUND

Field of the Disclosure

Aspects of the present disclosure relate to wireless communications, and more particularly, to techniques for power headroom reporting for wireless systems that deploy repeaters.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a network entity. The method includes receiving a repeater power headroom report (RPHR) for at least a first repeater; and performing one or more actions, based on the RPHR, to maintain a link between a user equipment (UE) and the network entity or another UE.

Another aspect provides a method for wireless communication by a controller. The method includes determining power headroom for at least a first repeater; and transmitting, to a network entity, a RPHR indicating the power headroom for at least the first repeater.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
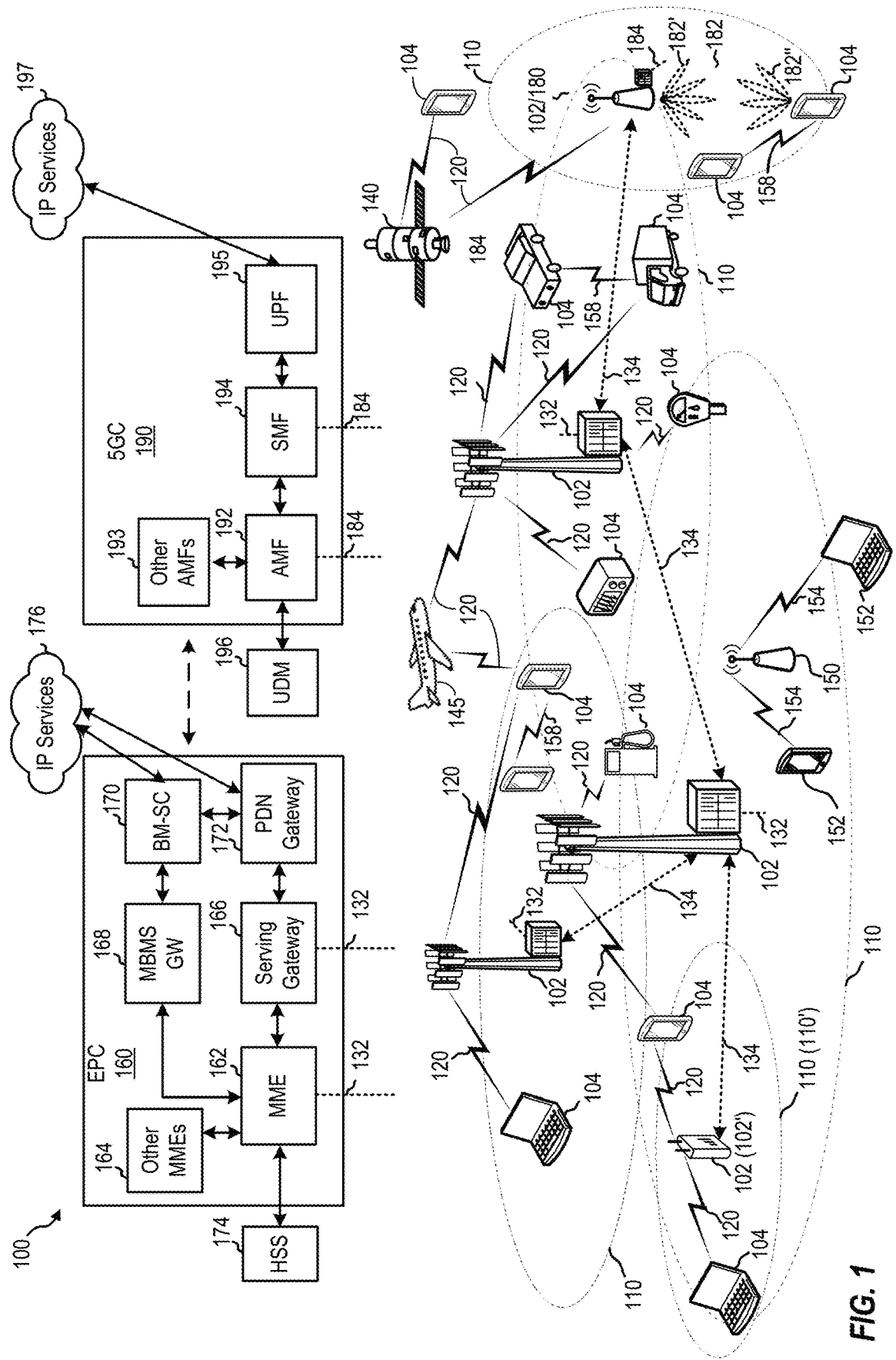
FIG. 1 depicts an example wireless communications network.

Aspects of the present disclosure provide apparatuses, methods, processing systems, and computer-readable mediums for power headroom reporting and control for repeaters.

In wireless communication systems, a power control mechanism that is responsible for setting transmission power for uplink transmissions from a user equipment (UE) is implement on the base station side. Via this mechanism, the base station sends transmission power control (TPC) commands that control backoff (BO) of the UE power amplifier (PA). One challenge of this approach is that the base station may not be aware of how much power the UE can emit without potentially violating some of radio access network (RAN) requirements, such as error vector magnitude (EVM), in-band emission (IBE), and adjacent channel interference (ACI) requirements.

To address this challenge, a closed loop control mechanism provides information regarding available power change limits at the UE, in the form of a power headroom (PH) report (PHR). This mechanism may be sufficient for cases in which there is a direct link between the UE and gNb, as the link budget (LB) in such cases is dictated by transmitted power and channel attenuation. The transmitted power is dictated by the peak-to-average-power ratio (PAPR) of the signal at the transmitter and, therefore, the PAPR of the signal at the input to the PA has a direct influence on the LB.

In some cases, however, repeaters may be used to enhance coverage, such that a path between a UE and base station may involve multiple hops. In such cases, when there is at least a single amplify and forward (AF) repeater in the link, the dynamic range (DR) of the signal at the input to each of the hops in the link is dictated not only by the DR of the transmitted (Tx) signal, but also by the aggregated backhaul (BH) channel from the transmitter to a specific hop. Further, because of multipath channel effects, the PAPR may increase from one hop to another.

If the BH channel (from a transmitter to specific hop) is known to the transmitter, the DR at the input to that specific hop could be controlled by PAPR reduction block (in the TX). In this cases, the BH channel impact could be mitigated to target a desired PAPR at the input of the specific hop (and therefore be able to optimize its power efficiency). Unfortunately, the transmitter (e.g., a gNb for downlink transmissions) is not typically aware of the absolute gain that each repeater can (or should) apply to optimize the end to end (E2E) LB, or any other key performance indicator (KPI).

Aspects of the present disclosure, however, may help provide this information, in the form of repeater power headroom reports (RPHR). The information in these reports may include PH values for certain AF repeaters in the link, providing insight to the base station regarding repeater capabilities to amplify the signal. As such, information in the RPHR may help optimize E2E parameters for uplink and/or downlink transmissions, improve overall system performance and user experience.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
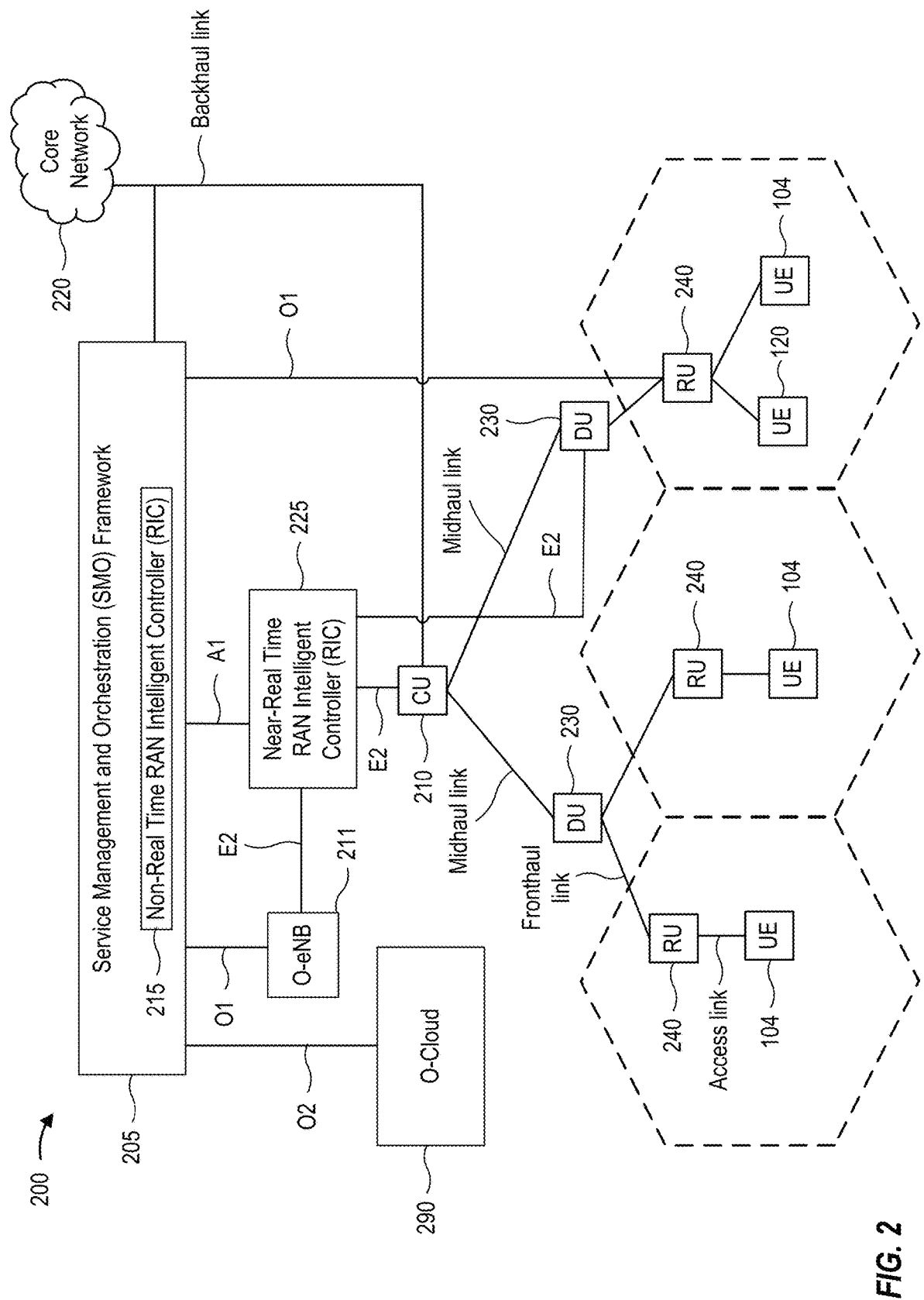
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
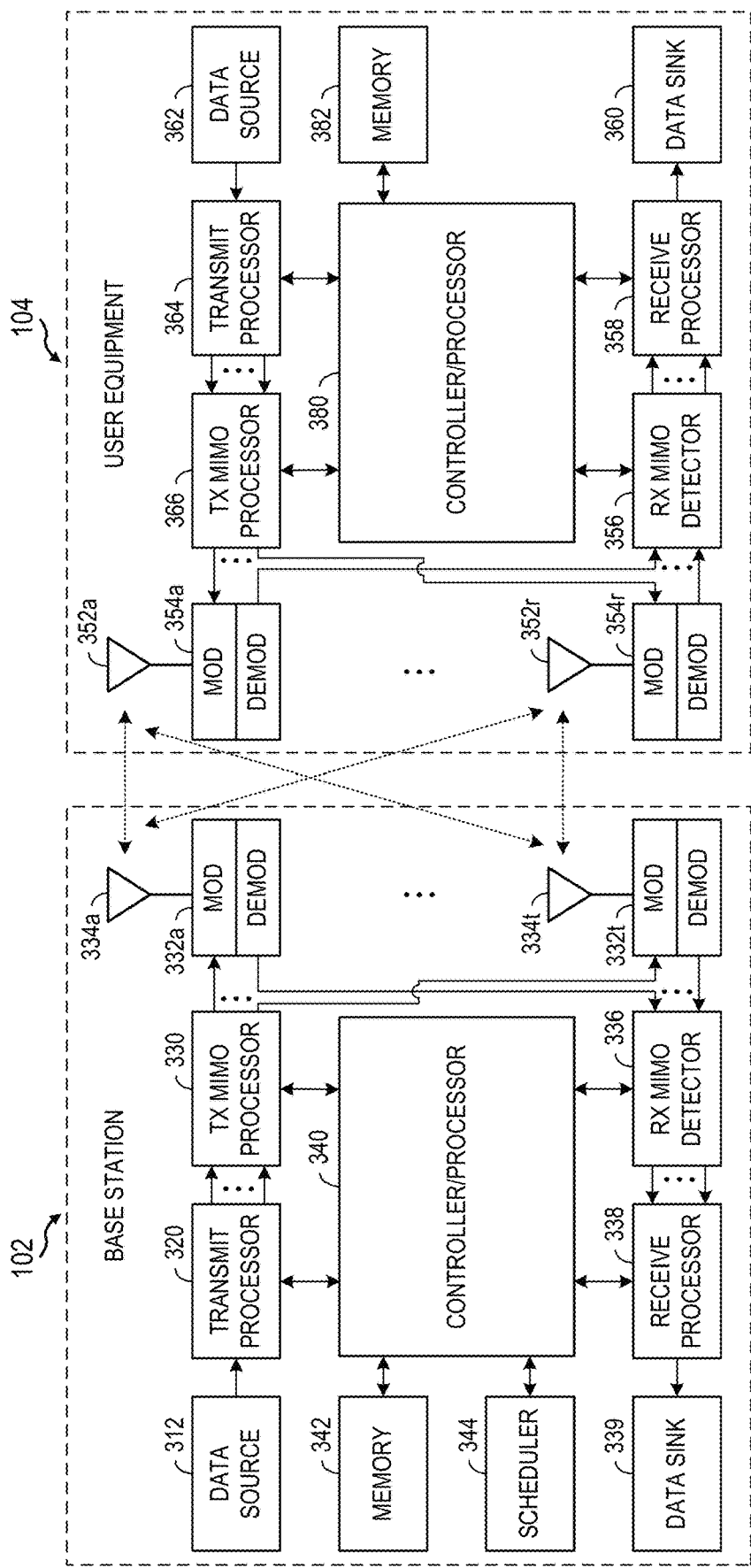
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a*-*t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Power Headroom Reporting

UE battery life has a great impact on user experience, which is a key factor for satisfying different use cases in 5G NR including ultra-reliable and low latency communications (URLLC), massive machine type communications (mMTC), and enhanced mobile broadband (eMBB). To help extend battery life, a UE power headroom report (PHR) may be sent by UEs to the network for improving energy efficiency. The PHR indicates a value for power headroom (PH) available in the UE. As noted above, PH generally indicates the difference between the maximum transmission power allowed by UEs and the currently evaluated uplink transmission on physical uplink shared channel (PUSCH), which can be described by a formula:

$$PH = P_{max} - P_{pusch},$$

A negative PH value typically means a current PUSCH transmission power has exceeded the maximum allowed transmission power and the RB allocation can be reduced in the next scheduling. A positive PH value typically means the current PUSCH transmission power is below the allowed transmission power and the RB allocation can be maintained or increased.

PH may be reported via a MAC control element which may have fields for one or more component carriers. For example, each field may have 6 bits to indicate 64 levels from 0 to 63, each of which corresponds to a PH value range. A PH value (in terms of dB) may be obtained by using the 6 bit value indicated in the MAC CE as an index into a power headroom report mapping table. In other words, the power headroom report mapping table maps each 6-bit PH value to a range such that, given the reported 6-bit value, the network can determine the range (in dB) of the PH quantity measured by the UE.

Overview of Repeater Operation

Next generation (5G) wireless networks have stated objectives to provide ultra-high data rate and support wide scope of application scenarios. Integrated access and backhaul (IAB) systems including repeaters have been studied in 3GPP as one possible solution to help support these objectives.

In IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul (BH) links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement PHY/MAC/RLC layers.

Certain aspects of the present disclosure relate to L1 relays (referred to as repeaters). L1 relays/repeaters have many attractive features. For example, such repeaters are relatively simple, low-cost, low-power, and are wirelessly connected to a donor or another relay (e.g., a gNB).

One example application of how repeaters may be used to help improve coverage by overcoming blockage (the obstruction of RF signals by an object). It is generally understood that blockage is a major issue in mmW (e.g., high frequencies) where beamforming is used to send directional signals. Repeaters may allow a gNB to serve a UE even though objects may prevent at least some directional RF signals from reaching the UEs. If one repeater is not blocked, it may receive RF signals from the gNB and re-transmit (e.g., amplify and forward) those signals to reach the UE (although the UE may be blocked from receiving signals from gNB directly). Thus, L1 repeaters may serve as relatively simple and inexpensive solutions to provide protection against blockage, extend the coverage of a MMW cell, and fill coverage holes.

In some cases, a repeater may receive an RF signal in one panel (corresponding to a receive or Rx Beam) and may (re-)transmit the signal in another panel (corresponding to a transmit or Tx Beam). For example, the repeater may simply amplify the received signal and forwards it to become the transmitted signal (e.g., amplify-and-forward or A/F). The repeater may be able to receive a RF (e.g., downlink) signal from a base station and relay that RF signal to a UE (e.g., that is blocked from receiving the RF signal directly from the base station. In the other (uplink) direction, the repeater may receive an RF signal from a UE and relay that RF signal to the base station.

In some cases, receive and transmit panels of a repeater may be used to implement some fixed beam patterns. For wide coverage, the beam patterns are usually wide, and therefore may not achieve high array gains. The repeater may typically not be aware of whether the signal is downlink or uplink in a TDD system and operates in both directions (full duplex) simultaneously.

As noted above, certain types of repeaters may generally perform basic operations of receiving an analog RF signal on its RX antennas (e.g., based on some configured RX beamforming), amplifying the power of the received analog RF signal, and transmitting the amplified signal from its TX antennas (e.g., based on some configured TX beamforming). In some cases, the beamforming may be accomplished via phased antenna arrays configured by a controller, while the amplification may be accomplished by a variable gain amplifier. The repeater may also communicate some control signals with a server (e.g., a base station serving as a donor, control node, etc.) via a control interface. The control interface may be implemented out-of-band (operating outside the carrier frequency on which the Rx signal is received) or in-band (e.g., using a smaller bandwidth part of the same carrier frequency). An out-of-band control interface 820 may be implemented, for example, via a separate (e.g. low-frequency) modem using a different radio technology (like BT) or different frequency (LTE NB-IoT).

Aspects Related to Power Headroom Reporting and Control for Repeaters

Aspects of the present disclosure provide apparatuses, methods, processing systems, and computer-readable mediums for power headroom reporting and control for repeaters.

Figure 5:
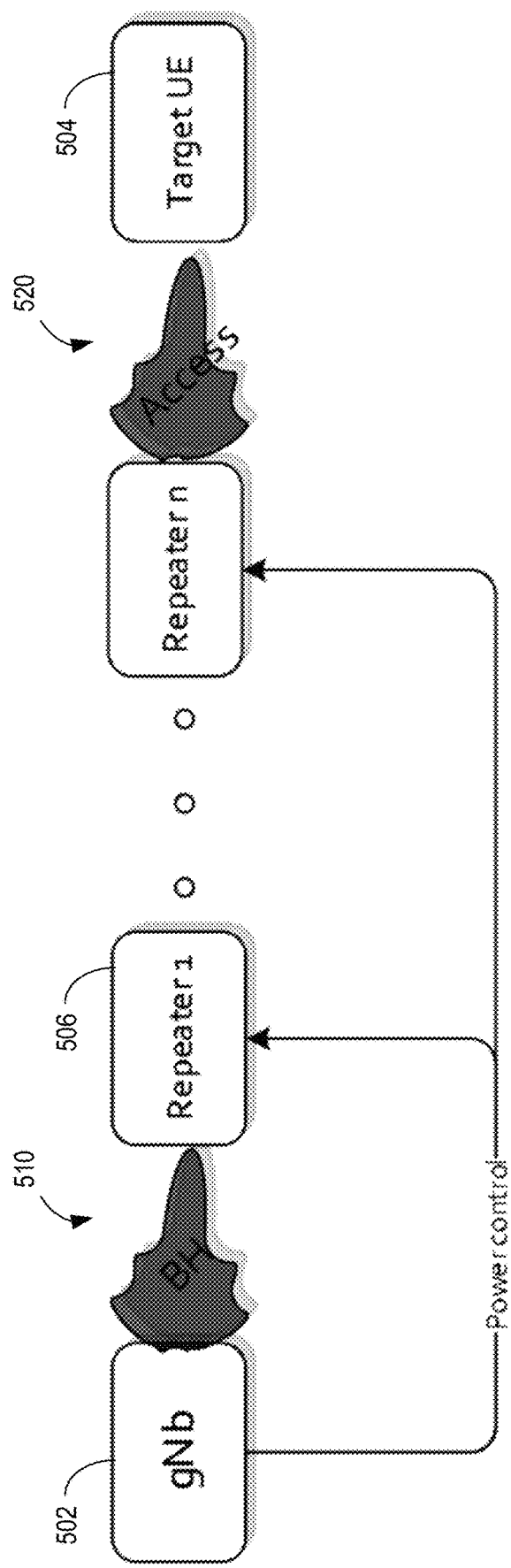
FIG. 5 depicts an example multi-hop deployment of wireless repeaters, in which aspects of the present disclosure may be utilized.

For example, aspects of the present disclosure provide mechanisms for power headroom reporting and control for repeaters, such as repeaters 506 (repeaters 1 . . . n) shown in FIG. 5. As noted above, the repeaters may be used to help deliver uplink and downlink transmissions between a base station (e.g., a gNB 502) and a UE 504, from a backhaul (BH) 510 to an access link 520. One or more of the repeaters may be AF repeaters and the dynamic range (DR) of the signal at the input to each repeater may be dictated by the aggregated BH and access links from the transmitter to a specific hop.

In a typical scenario, the BH SNR of repeaters may be expected to be relatively high. For example, 90% of the time, BH SNR may be above 20 dB in a deployment with 100 MHz BW and a macro-cell with transmit power of 26.1 dBm and peak antenna gain of 33.9 dB, a small cell with Tx power of 16.9 dBm and peak antenna gain of 25.1 dB. Repeaters, assuming a donor cell is either a macro-cell or a small-cell, may have a peak antenna gain of 19.8 dB and a noise figure of 6.7 dB.

By providing repeater PHR (RPHR) for particular hops, the channel impact could be mitigated to target a desired PAPR at the input of the specific hop in order to optimize its power efficiency. Aspects of the present disclosure may be applied to a variety of different scenarios in which the RPHR at certain repeaters may help optimize E2E parameters for uplink and/or downlink transmissions, improve overall system performance and user experience.

For example, some repeaters may be connected to a power grid, while other repeaters may not be connected to the power grid, but to a renewable energy source (such as solar or wind) with a dynamic power supply. Repeaters connected to a renewable energy source may reduce the power amplifier (PA) bias to reduce the power consumption. This reduction in PA bias may immediately affect the LB of the entire link, and some type of adjustment should be applied.

Figure 6A:
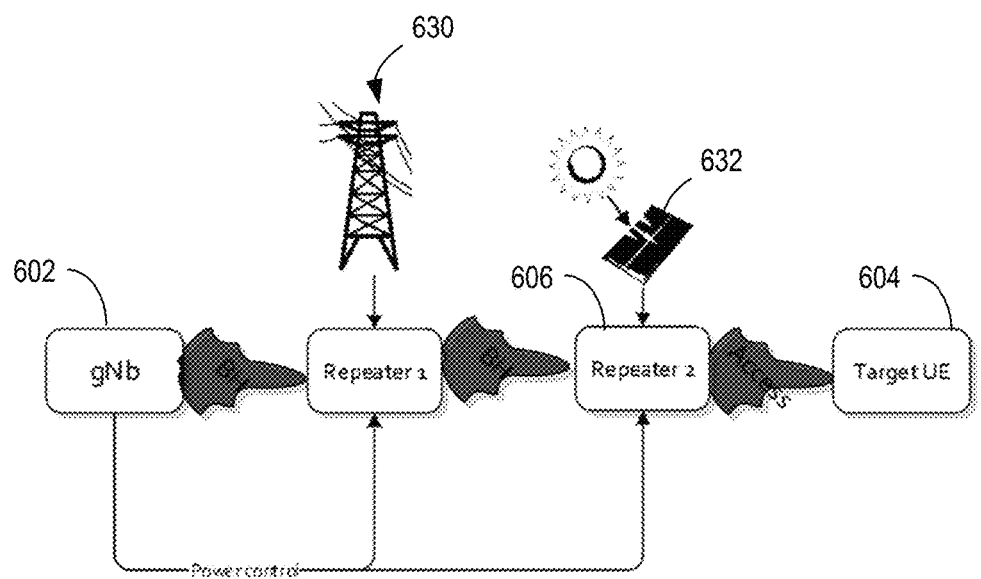
FIGS. 6A and 6B depict examples that may impact repeater performance and operation.

This may be understood with reference to the example shown in FIG. 6A, that assumes two repeaters 606, Repeater 1 and Repeater 2, to assist in transmissions between a gNB 602 and a target UE 604. As shown, Repeater 1 may be connected to a power grid 630 and Repeater 2 may be connected to a solar power supply 632. As such, Repeater 2 may have limited power at certain hours of the day. During sunny hours, Repeater 2 may have enough power to operate its PA in a highest PA bias possible. During cloudy hours, there may be some power shortage which will lead Repeater 2 to reduce the bias of its PA.

Since the gNb is not aware about the power supply constraints, Repeater 2 may signal its PHR, via a RPHR (e.g., periodically). In such cases, Repeater may calculate the Received Signal Strength Indicator (RSSI) plus PAPR. Repeater 2 may compare the result to the bias of the PA at a given time, to calculate RPHR. Repeater 2 may then signal the RPHR to the network.

Based on the RPHR, the network (via gNB) may take one or more actions. For example, the network may apply a receive signal (RX) PAPR reduction, to address the PAPR at the input to Repeater 2. In some cases, the gNB may adjust the gain of Repeater 1. In some cases, the gNB may use an alternate repeaters path (if applicable) and, in such cases, the gNB may turn off Repeater 2 (and/or Repeater 1), in order to save power if needed.

Figure 6B:
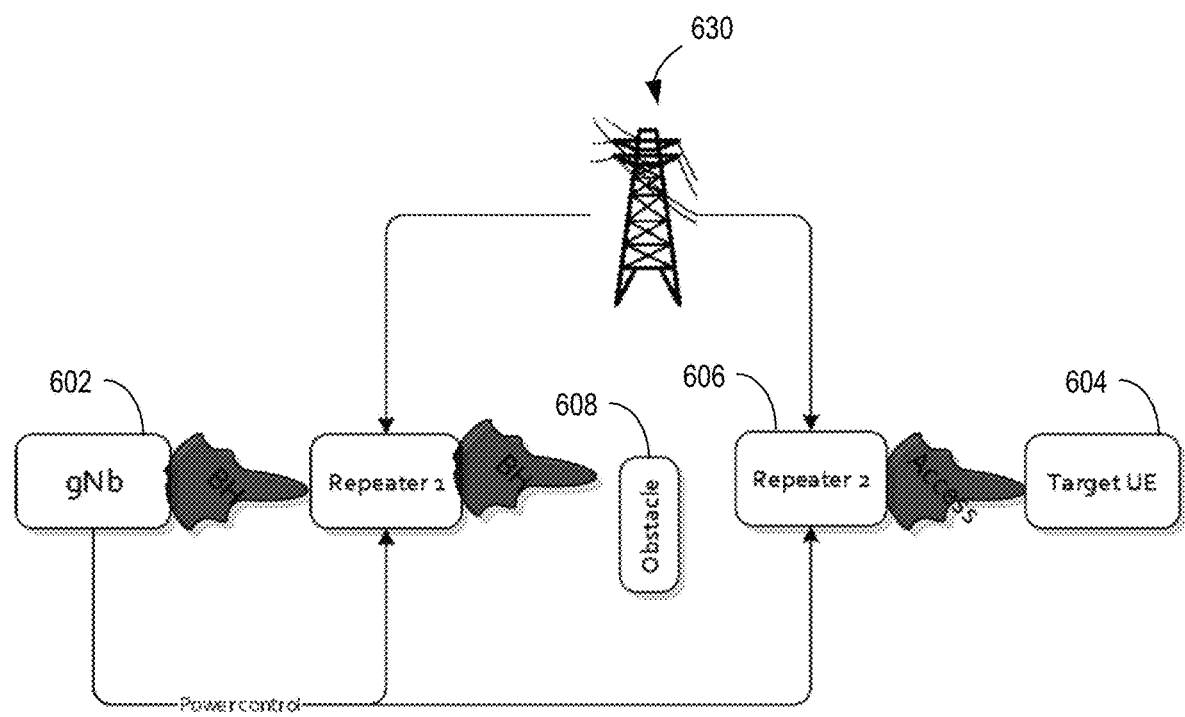

Another example, illustrated in FIG. 6B, assumes both Repeater 1 and Repeater 2 are connected to the power grid. In this case, even though the BH channel may be expected to have a mid/high SNRs, there may be some cases that may impact how power control planning should be applied to the repeaters. For example, due to dynamic environment (or weather conditions), an obstacle 608 may appear between any of the hops, such as between Repeater 1 and Repeater 2.

While the gNb is typically not aware about such factors in real time, according to aspects of the present disclosure, Repeater 2 may signal (with certain periodicity), the RPHR. In this case, Repeater 2 may calculate the RSSI and RSSI plus PAPR. Repeater 2 may compare the result to the bias of the PA at a given time, in order to calculate the RPHR. Repeater 2 may then signal the RPHR and the RSSI to the network.

Based on the RPHR, the network (via gNB) may take one or more actions. For example, if the network decides there is an obstacle based on the RPHR, then the network may want to increase the power of Repeater 1. To accomplish this, the network may focus the PAPR reduction on the RX of Repeater 1, in an effort to increase its emitted power. For example, PAPR on the Rx of Repeater 1 may be decreased by decreasing the Repeater 1 backoff (BO) due to decreased PAPR at the input to its PA. In some cases, the gNB may use an alternate repeaters path (if applicable) and, in such cases, the gNB may turn off Repeater 2 (and/or Repeater 1), in order to save power if needed.

Figure 7A:
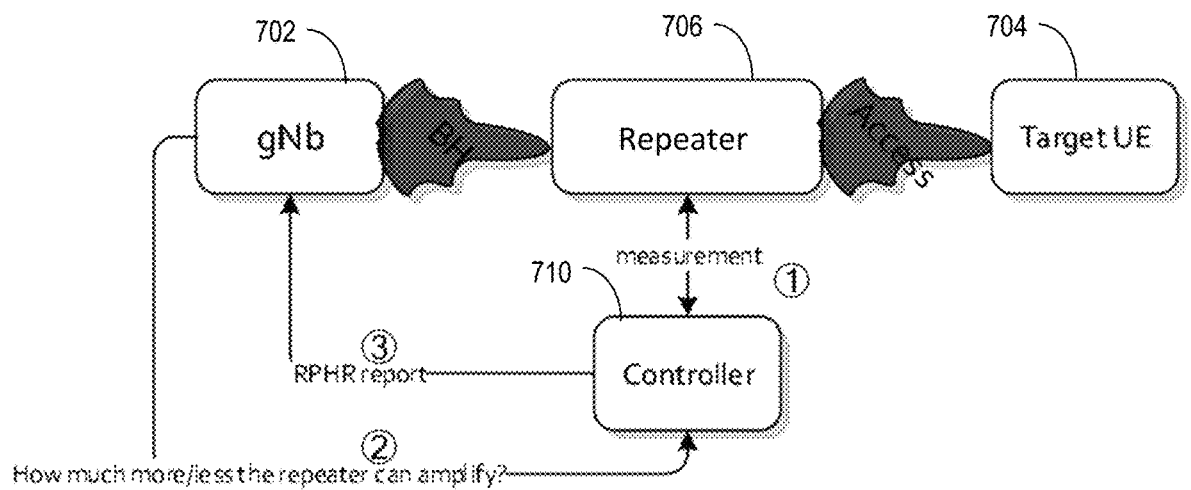
FIGS. 7A and 7B depict example operations for repeater power headroom reporting and control for downlink transmissions, in accordance with aspects of the present disclosure.
Figure 7B:
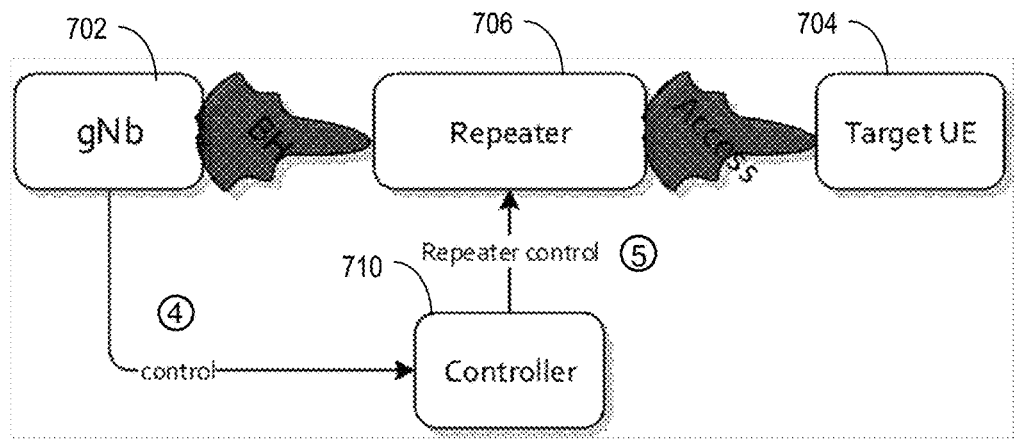

Power headroom reporting and control for repeaters 706, according to aspects of the present disclosure for downlink transmissions from a gNB 702 to a target UE 704 may be understood with reference to FIGS. 7A and 7B.

As illustrated in FIG. 7A, at a first step (1), the repeater 706 and/or repeater controller 710 may measure RPHR. If measured by the repeater, the repeater may indicate the measured RPHR to a repeater controller. For example, the repeater and/or the repeater controller may calculate the RSSI and RSSI plus PAPR. The repeater and/or the repeater controller may compare the result to the bias of the PA at a given time, in order to calculate the RPHR. In some cases, Repeater 2 may then signal the RPHR and the RSSI to the repeater controller.

At a second step (2), the gNB may send the repeater controller a request for the RPHR. In response, the repeater controller may send the report, at a third step (3).

The repeater controller may be configured to report RPHR for uplink transmissions, downlink transmission, or both. In some cases, the gNB may configure the repeater controller to periodically send RPHR. The RPHR generally refers to a report that will indicate how much more/less the repeater could amplify a signal, in order to maintain certain conditions, such as LB, SNR, EVM, or power consumption related conditions.

In other words, even though an AF repeater may not be expected to perform any digital processing (e.g., due to latency), the AF repeater may be coupled to a digital repeater controller (e.g., like a UE or any other device) for control signaling. The repeater controller may represent a repeater controller that controls the repeater making measurements and communicating with the network.

As illustrated in FIG. 7B, at a fourth step (4), the gNb may send control information to the repeater controller. The repeater controller may then signal the repeater, for example at a fifth step (5), to configure the repeater according to the control information. In some cases, the gNB may signal the control information to the repeater controller, via a physical downlink control channel (PDCCH), medium access control (MAC) control element (CE), such as a transmission configuration indicator (TCI) state for which the repeater/controller will perform the measurement.

The gNb may also signal information regarding a receive (RX) beam (or set of beams) of the repeater. For example, in default, this information may include the RX beam associated with the TCI state. In some cases, however, the gNb may also request a report regarding the best "X" RX beams, which may allow the gNb to optimize the LB by utilization of the beam management.

In some cases, the repeater controller may measure the RSSI, PAPR, and/or optimal PA Bias. From this information, the controller may calculate the RPHR. In some cases, the measurement may be subject to a defined TCI and associated RX beam (or "X" best RX beams, if requested by the gNb).

In some cases, the repeater controller may signal the RPHR (in addition to RSSI) to the network via MAC-CE or RRC. The signaling may be periodic, aperiodic, or semi-persistent. In some cases, the signaling may include a time stamp. By adding a time stamp, the network may be able to recover past scheduling data, which may allow the network to know what was the transmitted data/power from a specific node, or a set of nodes (e.g., if a specific repeater serves more than a single node).

In some the network may consider the reported RSSI/RPHR (corresponding to a reported timestamp) to optimize a specific criteria of the link. For example, the network may attempt to optimize E2E LB or a power consumption constraint of a specific hop (in some cases, the network may signal which is to be optimized). In some cases, the optimization may involve reducing the RX PAPR of specific hop and controlling PA BO of the repeater.

Figure 8:
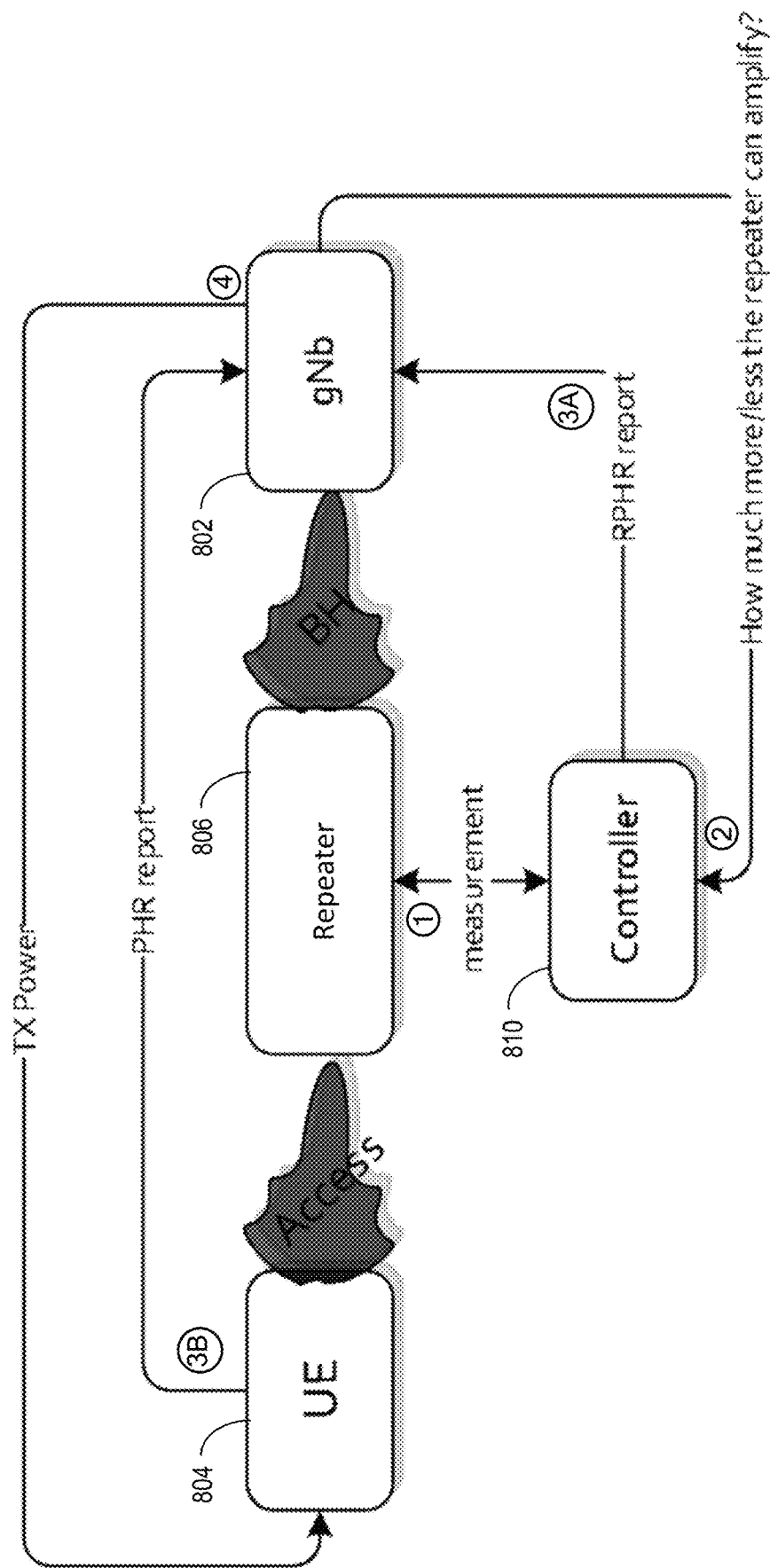
FIG. 8 depicts example operations for repeater power headroom reporting and control for uplink transmissions, in accordance with aspects of the present disclosure.

Power headroom reporting and control for repeaters, according to aspects of the present disclosure for uplink transmissions from a UE 804 to a gNB 802 may be understood with reference to FIG. 8.

As illustrated in FIG. 8, at a first step (1), a repeater 806 and/or controller 810 may measure RPHR. For example, the repeater (and/or repeater controller) may calculate the RSSI and RSSI plus PAPR. The repeater (and/or repeater controller) may compare the result to the bias of the PA at a given time, in order to calculate the RPHR.

At a second step (2), the gNB may send the repeater controller a request for the RPHR. In response, the repeater controller may send the RPHR report regarding the uplink, at a third step (3A). For uplink control, the UE may also send a PHR report, at another step (3B). At a fourth step (4), the gNb may send control information to the UE.

In some cases, the gNb may combine the PHR from the UE and the RPHR from the repeater in order to optimize the LB of the UL. In some cases, the combination of the PHR and RPHR could be done increase the TX power of the UE, for example, by selecting a minimum between the RPHR and PHR.

In some cases, the network may perform the power control considering the RPHR reported by repeater which is closest to the UE (or any other repeater in the multi hop link. In such cases, power control signaling may change the power level (based on the information from PHR and/or RPHR).

In some cases, repeaters may initiate (MAC-CE/RRC) for its own RPHR signaling, without being requested by the network. This could be due to a sudden change in PA bias, or any other change in conditions. This could also be a conditional RPHR, for example, where the repeater may be configured to signal to the network that the PH is X if the PAPR is Y, and PH is Z if the PAPR is Q.

As noted above, in some cases, the network may consider the reported conditional RPHR to optimize a specific criteria of the link. For example, the specific criteria may relate to E2E LB optimization or power consumption constraints of specific hop. In some cases, this may be done by reducing the RX PAPR of a specific hop and controlling its PA BO. In some cases, the network may signal the BO control of the repeater based on conditional RPHR (e.g., the signaled BO will also be conditional).

In some cases, the controller/repeater may be able to initiate its own report, For a certain TCI state, the report may include a list of RX beams with associated RPHR measurement. This may be useful, for example, if the controller/repeater would think that the PA power utilization may be improved. In some cases, the network may be configured to initiate transmission of the RPHR, for a certain transmission configuration indicator (TCI) state, including a list of one or more receive beams and associated repeater power headroom measurements.

Figure 9:
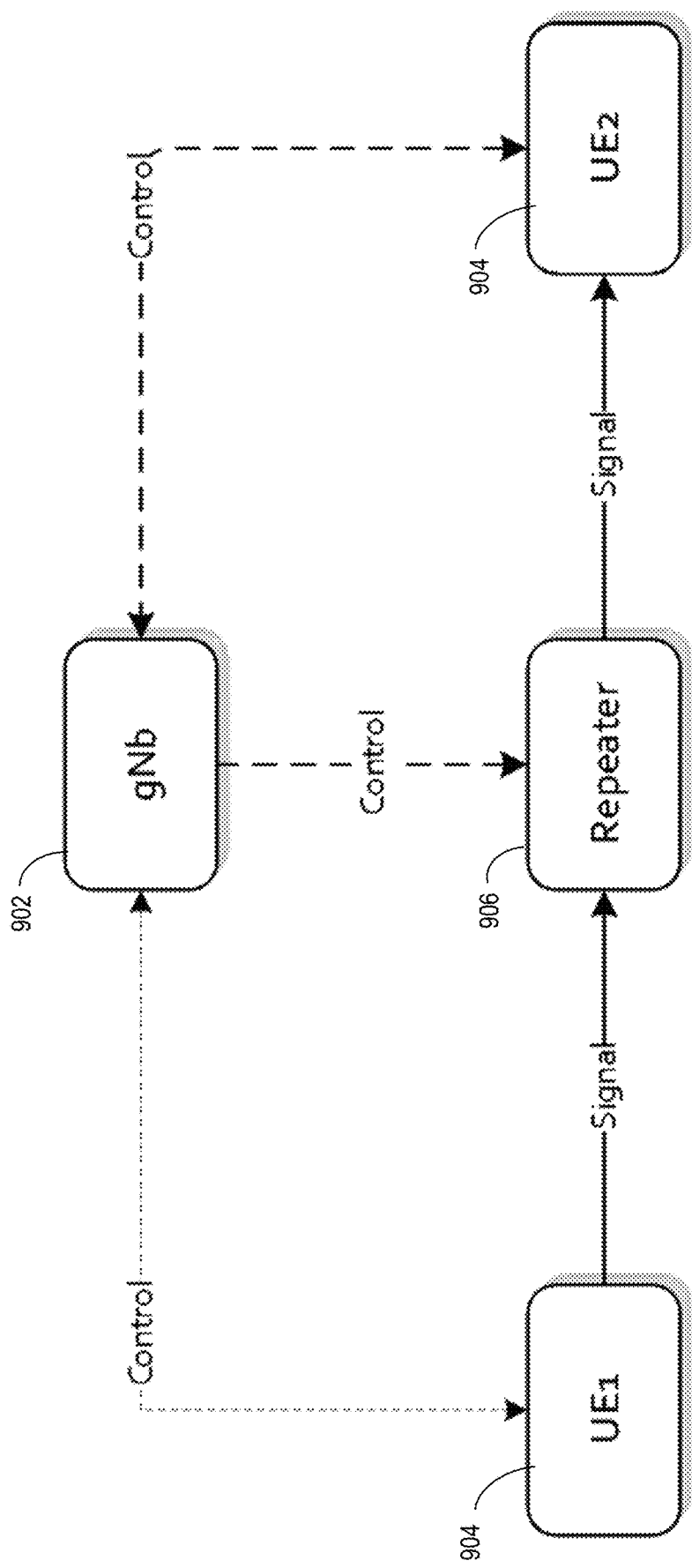
FIG. 9 depicts example operations for repeater power headroom reporting and control for sidelink transmissions, in accordance with aspects of the present disclosure.

In some cases, the network may take one or more actions designed to optimize at least one of a cellular link between a UE 904 and the network entity (such as a gNB 902) or a sidelink between UEs 904 via a repeater 906, as illustrated in FIG. 9. The mechanisms described herein may be used as tools to help a network to control the LB and optimize the power control of the link in case of multi hop link. In some cases, signaling may be defined what is measured by a digital controller and what to signal back to the network (like RPHR/RSSI). The mechanisms described herein may help optimize power efficiency and LB of a multiple hop link.

Example Operations of a Network Entity

Figure 10:
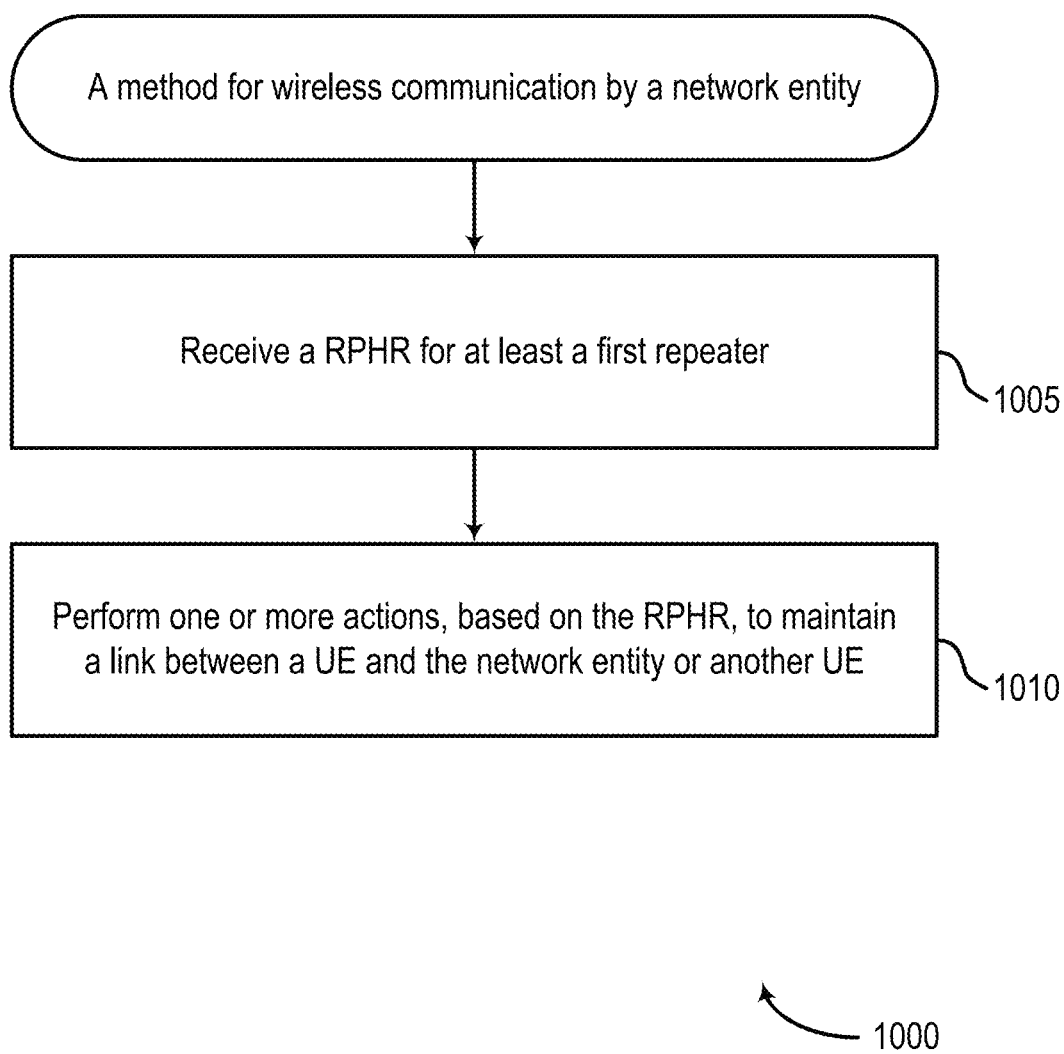
FIG. 10 depicts a method for wireless communications.

FIG. 10 shows an example of a method 1000 for wireless communication by a network entity, such as BS 102 of FIGS. 1 and 3, or a disaggregated base station as discussed with respect to FIG. 2.

Method 1000 begins at step 1005 with receiving a RPHR for at least a first repeater. In some cases, the operations of this step refer to, or may be performed by, circuitry for receiving and/or code for receiving as described with reference to FIG. 12.

Method 1000 then proceeds to step 1010 with performing one or more actions, based on the RPHR, to maintain a link between a UE and the network entity or another UE. In some cases, the operations of this step refer to, or may be performed by, circuitry for performing and/or code for performing as described with reference to FIG. 12.

In some aspects, the RPHR is associated with at least one of: uplink signals transmitted to the network entity; or downlink signals transmitted from the network entity.

In some aspects, the method 1000 further includes transmitting a controller of the first repeater configuration information indicating one or more receive beams for taking measurements for the RPHR. In some cases, the operations of this step refer to, or may be performed by, circuitry for transmitting and/or code for transmitting as described with reference to FIG. 12.

In some aspects, the configuration information indicates a TCI state associated with one of the receive beams.

In some aspects, the configuration information indicates at least one of: one or more parameters to include in the RPHR; or a number of best receive beams for which the controller is to include measurements in the RPHR.

In some aspects, the RPHR is received periodically, periodically, or semi-persistently.

In some aspects, the RPHR includes a time stamp; and the one or more actions comprise recovering past scheduling data based on the time stamp.

In some aspects, the one or more actions are designed to at least one of: optimize an end to end link budget between the network entity and UE; or optimize a power consumption constraint at a hop in the link between the network entity and UE.

In some aspects, the one or more actions are designed to optimize the power consumption constraint at the hop by reducing receive PAPR or controlling a BO of a PA of the first repeater.

In some aspects, the method 1000 further includes transmitting signaling indicating whether the BO of the PA is to be applied for power savings or link budget optimization. In some cases, the operations of this step refer to, or may be performed by, circuitry for transmitting and/or code for transmitting as described with reference to FIG. 12.

In some aspects, the RPHR is associated with uplink signals transmitted to the network entity; and the one or more actions comprise combining a power headroom from the UE and a power headroom from at least the first repeater in order to optimize an uplink link budget.

In some aspects, the one or more actions comprise increasing transmission power of the UE by selecting a minimum between a value indicated in the RPHR and a value indicated in the PHR.

In some aspects, the one or more actions further comprise performing power control considering the power headroom for a repeater that is closest to the UE or another repeater in the link, wherein performing the power control comprises changing a power level based on information from at least one of the RPHR or the power headroom for the repeater that is closest to the UE or another repeater in the link.

In some aspects, receipt of the RPHR indicates a condition is met, wherein the condition relates to at least one of: a change in one or more PA conditions at the first repeater; or a combination of power headroom and PAPR values.

In some aspects, the one or more actions comprise reducing receive PAPR or controlling a BO of a PA of the first repeater.

In some aspects, the controller is configured to initiate transmission of the RPHR, for a certain TCI state, including a list of one or more receive beams and associated repeater power headroom measurements.

In some aspects, at least one of the one or more actions are designed to optimize: a cellular link between a UE and the network entity; or a sidelink between UEs.

Figure 12:
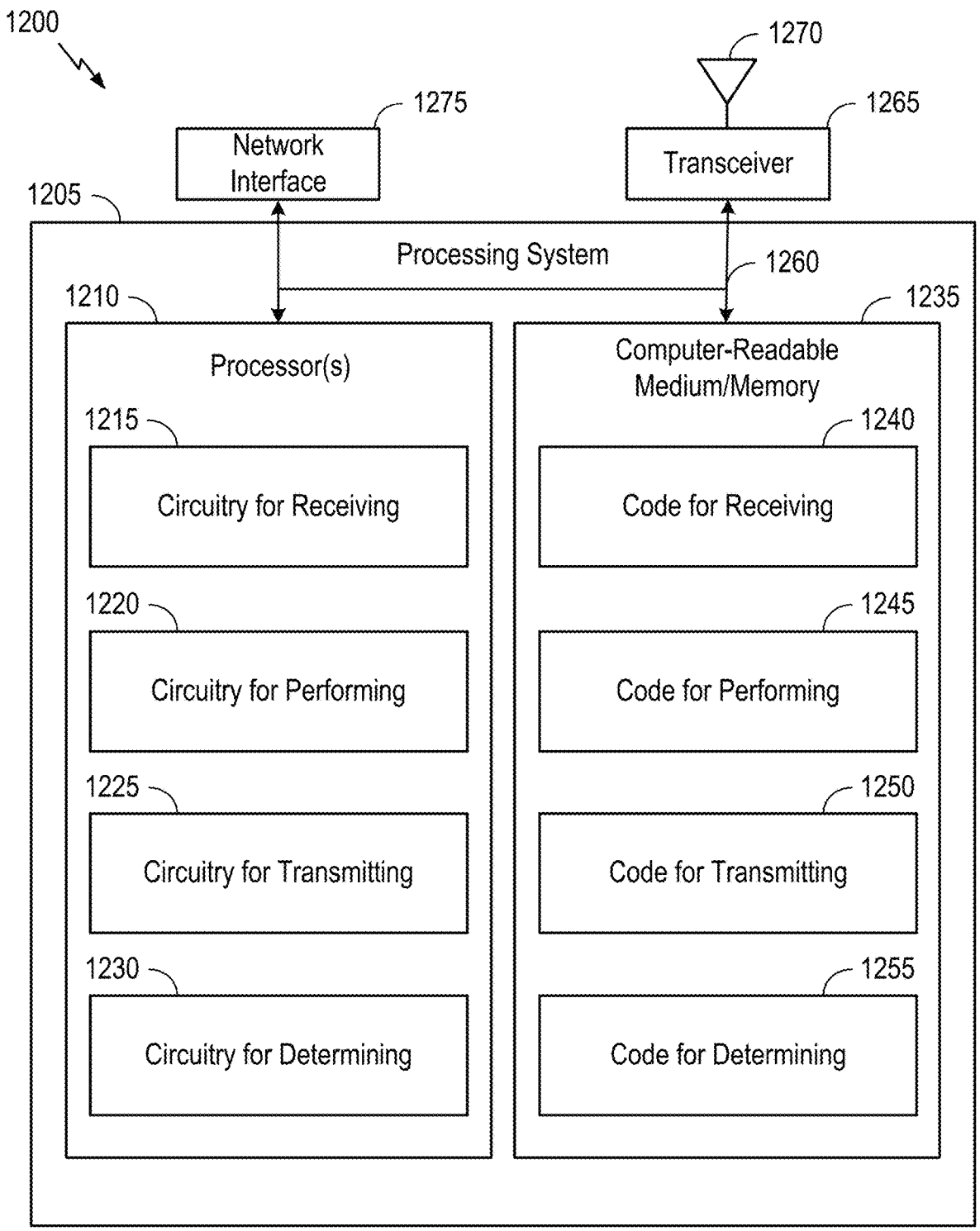
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Operations of a Controller

Figure 11:
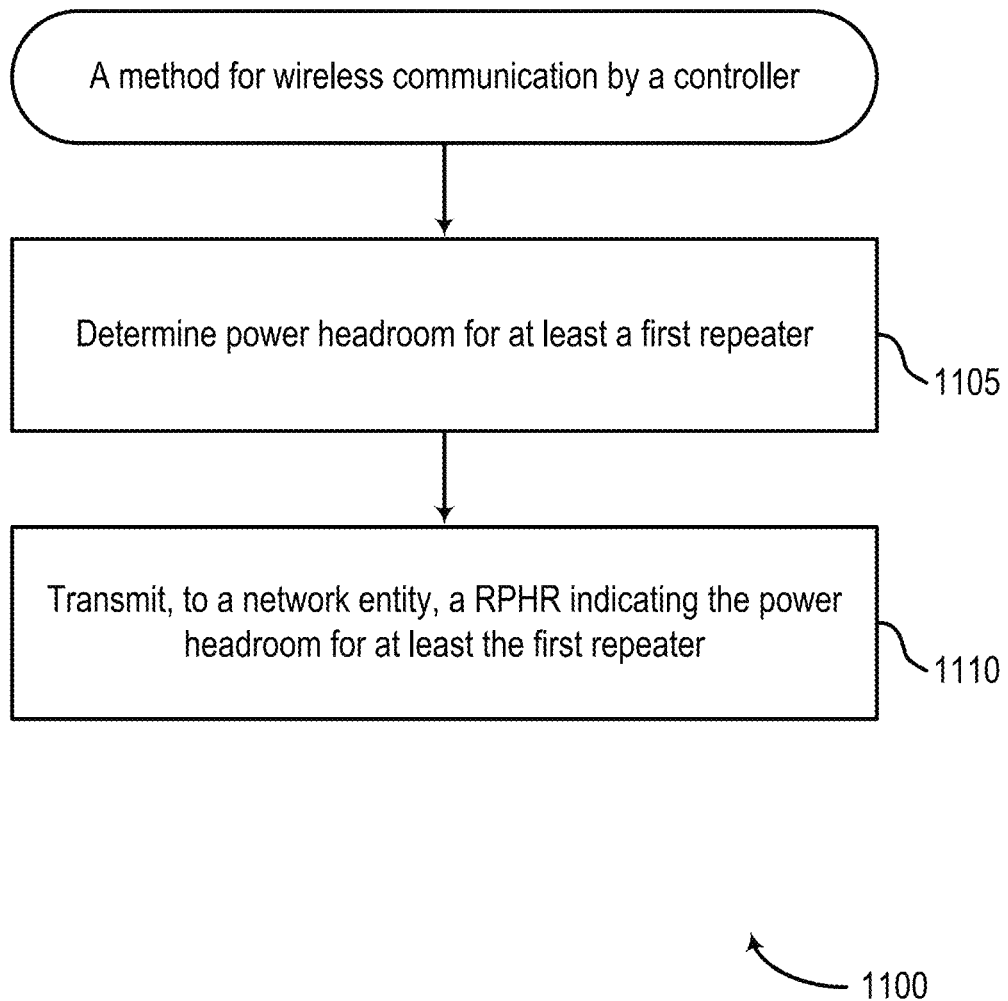
FIG. 11 depicts a method for wireless communications.

FIG. 11 shows an example of a method 1100 for wireless communication by a controller. In some examples, the controller is a network entity, such as a BS 102 of FIGS. 1 and 3, or a disaggregated base station as discussed with respect to FIG. 2. In some examples, the controller is a UE 104 of FIGS. 1 and 3.

Method 1100 begins at step 1105 with determining power headroom for at least a first repeater. In some cases, the operations of this step refer to, or may be performed by, circuitry for determining and/or code for determining as described with reference to FIG. 12.

Method 1100 then proceeds to step 1110 with transmitting, to a network entity, a RPHR indicating the power headroom for at least the first repeater. In some cases, the operations of this step refer to, or may be performed by, circuitry for transmitting and/or code for transmitting as described with reference to FIG. 12.

In some aspects, the RPHR is associated with at least one of: uplink signals transmitted to the network entity; or downlink signals transmitted from the network entity.

In some aspects, the method 1100 further includes receiving, from the network entity, configuration information indicating one or more receive beams for taking measurements for the RPHR. In some cases, the operations of this step refer to, or may be performed by, circuitry for receiving and/or code for receiving as described with reference to FIG. 12.

In some aspects, the configuration information indicates a TCI state associated with one of the receive beams.

In some aspects, the configuration information indicates at least one of: one or more parameters to include in the RPHR; or a number of best receive beams for which the controller is to include measurements in the RPHR.

In some aspects, the RPHR is transmitted periodically, or semi-persistently.

In some aspects, the RPHR includes a time stamp; and the one or more actions comprise recovering past scheduling data based on the time stamp.

In some aspects, the controller transmits the RPHR when a condition is met, wherein the condition relates to at least one of: a change in one or more PA conditions at the first repeater; or a combination of power headroom and PAPR values.

In some aspects, the controller is configured to initiate transmission of the RPHR, for a certain TCI state, including a list of one or more receive beams and associated repeater power headroom measurements.

In one aspect, method 1100, or any aspect related to it, may be performed by an apparatus, such as communications device 1200 of FIG. 12, which includes various components operable, configured, or adapted to perform the method 1100. Communications device 1200 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a user equipment, such as UE 104 described above with respect to FIGS. 1 and 3. In some aspects, communications device 1200 is a network entity, such as BS 102 of FIGS. 1 and 3, or a disaggregated base station as discussed with respect to FIG. 2.

The communications device 1200 includes a processing system 1205 coupled to the transceiver 1265 (e.g., a transmitter and/or a receiver). In some aspects (e.g., when communications device 1200 is a network entity), processing system 1205 may be coupled to a network interface 1275 that is configured to obtain and send signals for the communications device 1200 via communication link(s), such as a backhaul link, midhaul link, and/or fronthaul link as described herein, such as with respect to FIG. 2. The transceiver 1265 is configured to transmit and receive signals for the communications device 1200 via the antenna 1270, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. In various aspects, one or more processors 1210 may be representative of one or more of receive processor 338, transmit processor 320, TX MIMO processor 330, and/or controller/processor 340, as described with respect to FIG. 3. The one or more processors 1210 are coupled to a computer-readable medium/memory 1235 via a bus 1260. In certain aspects, the computer-readable medium/memory 1235 is configured to store instructions (e.g., computer-executable code) that when executed by the one or more processors 1210, cause the one or more processors 1210 to perform: the method 1000 described with respect to FIG. 10, or any aspect related to; and/or the method 1100 described with respect to FIG. 11, or any aspect related to it. Note that reference to a processor performing a function of communications device 1200 may include one or more processors 1210 performing that function of communications device 1200.

In the depicted example, computer-readable medium/memory 1235 stores code (e.g., executable instructions), such as code for receiving 1240, code for performing 1245, code for transmitting 1250, and code for determining 1255. Processing of the code for receiving 1240, code for performing 1245, code for transmitting 1250, and code for determining 1255 may cause the communications device 1200 to perform: the method 1000 described with respect to FIG. 10, or any aspect related to; and/or the method 1100 described with respect to FIG. 11, or any aspect related to it.

The one or more processors 1210 include circuitry configured to implement (e.g., execute) the code stored in the computer-readable medium/memory 1235, including circuitry such as circuitry for receiving 1215, circuitry for performing 1220, circuitry for transmitting 1225, and circuitry for determining 1230. Processing with circuitry for receiving 1215, circuitry for performing 1220, circuitry for transmitting 1225, and circuitry for determining 1230 may cause the communications device 1200 to perform: the method 1000 described with respect to FIG. 10, or any aspect related to; and/or the method 1100 described with respect to FIG. 11, or any aspect related to it.

Various components of the communications device 1200 may provide means for performing: the method 1000 described with respect to FIG. 10, or any aspect related to; and/or the method 1100 described with respect to FIG. 11, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1265 and the antenna 1270 of the communications device 1200 in FIG. 12. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1265 and the antenna 1270 of the communications device 1200 in FIG. 12.

Example Clauses

Implementation examples are described in the following numbered clauses:

Clause 1: A method for wireless communication by a network entity, comprising: receiving a RPHR for at least a first repeater; and performing one or more actions, based on the RPHR, to maintain a link between a UE and the network entity or another UE.

Clause 2: The method of Clause 1, wherein the RPHR is associated with at least one of: uplink signals transmitted to the network entity; or downlink signals transmitted from the network entity.

Clause 3: The method of any one of Clauses 1 and 2, further comprising: transmitting a controller of the first repeater configuration information indicating one or more receive beams for taking measurements for the RPHR.

Clause 4: The method of Clause 3, wherein the configuration information indicates a TCI state associated with one of the receive beams.

Clause 5: The method of Clause 3, wherein the configuration information indicates at least one of: one or more parameters to include in the RPHR; or a number of best receive beams for which the controller is to include measurements in the RPHR.

Clause 6: The method of any one of Clauses 1-5, wherein the RPHR is received periodically, periodically, or semi-persistently.

Clause 7: The method of any one of Clauses 1-6, wherein: the RPHR includes a time stamp; and the one or more actions comprise recovering past scheduling data based on the time stamp.

Clause 8: The method of any one of Clauses 1-7, wherein the one or more actions are designed to at least one of: optimize an end to end link budget between the network entity and UE; or optimize a power consumption constraint at a hop in the link between the network entity and UE.

Clause 9: The method of Clause 8, wherein the one or more actions are designed to optimize the power consumption constraint at the hop by reducing receive PAPR or controlling a BO of a PA of the first repeater.

Clause 10: The method of Clause 9, further comprising: transmitting signaling indicating whether the BO of the power amplifier is to be applied for power savings or link budget optimization.

Clause 11: The method of any one of Clauses 1-10, wherein: the RPHR is associated with uplink signals transmitted to the network entity; and the one or more actions comprise combining a power headroom from the UE and a power headroom from at least the first repeater in order to optimize an uplink link budget.

Clause 12: The method of Clause 11, wherein the one or more actions comprise increasing transmission power of the UE by selecting a minimum between a value indicated in the RPHR and a value indicated in the PHR.

Clause 13: The method of Clause 11, wherein the one or more actions further comprise performing power control considering the power headroom for a repeater that is closest to the UE or another repeater in the link, wherein performing the power control comprises changing a power level based on information from at least one of the RPHR or the power headroom for the repeater that is closest to the UE or another repeater in the link.

Clause 14: The method of any one of Clauses 1-13, wherein receipt of the RPHR indicates a condition is met, wherein the condition relates to at least one of: a change in one or more PA conditions at the first repeater; or a combination of power headroom and PAPR values.

Clause 15: The method of Clause 14, wherein the one or more actions comprise reducing receive PAPR or controlling a BO of a power amplifier of the first repeater.

Clause 16: The method of any one of Clauses 1-15, wherein the controller is configured to initiate transmission of the RPHR, for a certain TCI state, including a list of one or more receive beams and associated repeater power headroom measurements.

Clause 17: The method of any one of Clauses 1-16, wherein at least one of the one or more actions are designed to optimize: a cellular link between the UE and the network entity; or a sidelink between the UE and at least one other UE.

Clause 18: A method for wireless communication by a controller, comprising: determining power headroom for at least a first repeater; and transmitting, to a network entity, a RPHR indicating the power headroom for at least the first repeater.

Clause 19: The method of Clause 18, wherein the RPHR is associated with at least one of: uplink signals transmitted to the network entity; or downlink signals transmitted from the network entity.

Clause 20: The method of any one of Clauses 18 and 19, further comprising: receiving, from the network entity, configuration information indicating one or more receive beams for taking measurements for the RPHR.

Clause 21: The method of Clause 20, wherein the configuration information indicates a TCI state associated with one of the one or more receive beams.

Clause 22: The method of Clause 20, wherein the configuration information indicates at least one of: one or more parameters to include in the RPHR; or a number of best receive beams for which the controller is to include measurements in the RPHR.

Clause 23: The method of any one of Clauses 18-22, wherein the RPHR is transmitted periodically, periodically, or semi-persistently.

Clause 24: The method of any one of Clauses 18-23, further comprising: including a timestamp in the RPHR.

Clause 25: The method of any one of Clauses 18-24, wherein the controller transmits the RPHR when a condition is met, wherein the condition relates to at least one of: a change in one or more PA conditions at the first repeater; or a combination of power headroom and PAPR values.

Clause 26: The method of any one of Clauses 18-25, wherein the controller is configured to initiate transmission of the RPHR, for a certain TCI state, including a list of one or more receive beams and associated repeater power headroom measurements.

Clause 27: An apparatus, comprising: a memory comprising executable instructions; and a processor configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by a processor of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a network entity, comprising:
    receiving a repeater power headroom report (RPHR) for at least a first repeater; and
    performing one or more actions, based on the RPHR, to maintain a link between a user equipment (UE) and the network entity or another UE, wherein:
    the RPHR includes a timestamp; and
    the one or more actions comprise recovering past scheduling data based on the time stamp.

2. The method of claim 1, wherein the RPHR is associated with at least one of:
    uplink signals transmitted to the network entity; or
    downlink signals transmitted from the network entity.

3. The method of claim 1, further comprising:
    transmitting, to a controller of the first repeater, configuration information indicating one or more receive beams for taking measurements for the RPHR.

4. The method of claim 3, wherein the configuration information indicates a transmission configuration indicator (TCI) state associated with one of the one or more receive beams.

5. The method of claim 3, wherein the configuration information indicates at least one of:
    one or more parameters to include in the RPHR; or
    a number of best receive beams for which the controller is to include measurements in the RPHR.

6. The method of claim 1, wherein the RPHR is received periodically, aperiodically, or semi-persistently.

7. The method of claim 1, wherein the one or more actions are designed to at least one of:
- optimize an end to end link budget between the network entity and the UE; or
- optimize a power consumption constraint at a hop in the link between the network entity and the UE.

8. The method of claim 7, wherein the one or more actions are designed to optimize the power consumption constraint at the hop by reducing receive peak to average power ratio (PAPR) or controlling a backoff (BO) of a power amplifier of the first repeater.

9. The method of claim 8, further comprising transmitting signaling indicating whether the BO of the power amplifier is to be applied for power savings or link budget optimization.

10. The method of claim 1, wherein:
- the RPHR is associated with uplink signals transmitted to the network entity; and
- the one or more actions comprise combining a power headroom from the UE and a power headroom from at least the first repeater in order to optimize an uplink link budget.

11. The method of claim 10, wherein the one or more actions comprise increasing transmission power of the UE by selecting a minimum between the power headroom from the UE and the power headroom from at least the first repeater.

12. The method of claim 10, wherein the one or more actions further comprise performing power control considering the power headroom for a repeater that is closest to the UE or another repeater in the link, wherein performing the power control comprises changing a power level based on information from at least one of the RPHR or the power headroom for the repeater that is closest to the UE or another repeater in the link.

13. The method of claim 1, wherein receipt of the RPHR indicates a condition is met, wherein the condition relates to at least one of:
- a change in one or more power amplitude (PA) conditions at the first repeater; or
- a combination of power headroom and peak to average power ratio (PAPR) values.

14. The method of claim 13, wherein the one or more actions comprise reducing receive peak to average power ratio (PAPR) or controlling a backoff (BO) of a power amplifier of the first repeater.

15. The method of claim 1, wherein a controller of the first repeater is configured to initiate transmission of the RPHR, for a certain transmission configuration indicator (TCI) state, including a list of one or more receive beams and associated repeater power headroom measurements.

16. The method of claim 1, wherein at least one of the one or more actions are designed to optimize:
- a cellular link between the UE and the network entity; or
- a sidelink between the UE and at least one other UE.

17. A method for wireless communication by a controller, comprising:
- determining a power headroom for at least a first repeater;
- generating a repeater power headroom report (RPHR) for at least the first repeater, the RPHR comprising an indication of the power headroom and a timestamp associated with scheduling data; and
- transmitting, to a network entity, the RPHR for at least the first repeater.

18. The method of claim 17, wherein the RPHR is associated with at least one of:
- uplink signals transmitted to the network entity; or
- downlink signals transmitted from the network entity.

19. The method of claim 17, further comprising:
- receiving, from the network entity, configuration information indicating one or more receive beams for taking measurements for the RPHR.

20. The method of claim 19, wherein the configuration information indicates a transmission configuration indicator (TCI) state associated with one of the one or more receive beams.

21. The method of claim 19, wherein the configuration information indicates at least one of:
- one or more parameters to include in the RPHR; or
- a number of best receive beams for which the controller is to include measurements in the RPHR.

22. The method of claim 17, wherein the RPHR is transmitted periodically, aperiodically, or semi-persistently.

23. The method of claim 17, wherein the controller transmits the RPHR when a condition is met, wherein the condition relates to at least one of:
- a change in one or more power amplitude (PA) conditions at the first repeater; or
- a combination of power headroom and peak to average power ratio (PAPR) values.

24. The method of claim 17, wherein the controller is configured to initiate transmission of the RPHR, for a certain transmission configuration indicator (TCI) state, including a list of one or more receive beams and associated repeater power headroom measurements.

25. A network entity configured for wireless communication, comprising: a memory comprising processor-executable instructions; and one or more processors configured to execute the processor-executable instructions and cause the network entity to:
- receive a repeater power headroom report (RPHR) for at least a first repeater; and
- perform one or more actions, based on the RPHR, to maintain a link between a user equipment (UE) and the network entity or another UE, wherein:
  - the RPHR includes a timestamp; and
  - the one or more actions comprise recovering past scheduling data based on the timestamp.

26. A controller configured for wireless communication, comprising: a memory comprising processor-executable instructions; and one or more processors configured to execute the processor-executable instructions and cause the controller to:
- determine power headroom for at least a first repeater;
- generate a repeater power headroom report (RPHR) for at least the first repeater, the RPHR comprising an indication of the power headroom and a timestamp associated with scheduling data; and
- transmit, to a network entity, the RPHR for at least the first repeater.

27. The controller of claim 26, wherein the RPHR is associated with at least one of:
- uplink signals transmitted to the network entity; or
- downlink signals transmitted from the network entity.

28. The controller of claim 26, wherein the one or more processors are configured to execute the processor-executable instructions and cause the controller to transmit the RPHR when a condition is met, wherein the condition relates to at least one of:
- a change in one or more power amplitude (PA) conditions at the first repeater; or a combination of power headroom and peak to average power ratio (PAPR) values.

\* \* \* \* \*